United States Patent
Lee

(10) Patent No.: US 7,073,838 B2
(45) Date of Patent: Jul. 11, 2006

(54) SEPARATION/ATTACHMENT OF SEAT FOR VEHICLES

(75) Inventor: Hak-sang Lee, Anyang-shi (KR)

(73) Assignee: Kia Motors Corporation, Seoul (KR)

( * ) Notice: Subject to any disclaimer, the term of this patent is extended or adjusted under 35 U.S.C. 154(b) by 809 days.

(21) Appl. No.: 09/923,741

(22) Filed: Aug. 7, 2001

(65) Prior Publication Data
US 2002/0074819 A1 Jun. 20, 2002

(30) Foreign Application Priority Data
Dec. 18, 2000 (KR) .............................. 2000-78066

(51) Int. Cl.
*B60N 2/44* (2006.01)
(52) U.S. Cl. ................. 296/65.03; 248/503.1
(58) Field of Classification Search ............ 296/65.03, 296/65.01; 248/503.1; 297/344.1
See application file for complete search history.

(56) References Cited

U.S. PATENT DOCUMENTS

| | | | | |
|---|---|---|---|---|
| 5,372,398 | A * | 12/1994 | Aneiros et al. .......... | 296/65.03 |
| 5,547,242 | A * | 8/1996 | Dukatz et al. .......... | 296/65.03 |
| 6,161,890 | A * | 12/2000 | Pesta et al. ............ | 296/65.01 |
| 6,196,611 | B1 * | 3/2001 | Lee .................... | 296/65.03 |
| 6,213,525 | B1 * | 4/2001 | Nicola ................. | 292/223 |

FOREIGN PATENT DOCUMENTS

| EP | 0 618 102 A1 | 10/1994 |
|---|---|---|
| EP | 1 040 958 A1 | 10/2000 |
| EP | 1 083 032 A2 | 3/2001 |

* cited by examiner

Primary Examiner—Joseph D. Pape
(74) Attorney, Agent, or Firm—Davis & Bujold, P.L.L.C.

(57) ABSTRACT

A mechanism for attaching a seat to and disconnecting the seat from a vehicle. The mechanism for attaching and disconnecting the seat having latch recesses on a lower frame of the seat, front and rear wheels for respectively engaging with front and rear seating recesses of a car body floor, and the latch recesses are located for engaging strikers fixed in the front and the rear seating recesses of the car body floor. The mechanism for attaching and disconnecting the seat has a control lever for controlling operation of the rear wheel. The control lever and a rotating bracket are connected and rotatably mounted on a hinge shaft, and the rotating bracket is coupled to the control lever via a pin. The rotating bracket is connected to the rear wheel via a connection link and a support lever, and the rear wheel is mounted to the support lever.

4 Claims, 3 Drawing Sheets

SEPARATION/ATTACHMENT OF SEAT FOR VEHICLES

This application claims priority from Korean Application Serial No. 2000-78066 filed Dec. 18, 2000.

FIELD OF THE INVENTION

The present invention relates to a seat mechanism for attaching the seat to and disconnecting the seat from strikers installed on a car body floor, and more particularly, to a seat mechanism for attaching the seat to and disconnecting the seat, of which a lower frame can be easily attached to and separated from the strikers by being easily moved by a link structure.

BACKGROUND OF THE INVENTION

In general, a part of a seat for vehicle can be attached to and removed from a car body floor to effectively utilize a restricted inside space of the vehicle. For example, in a motor omnibus of a van type, seats located on a rear part of a driver's seat can be attached or removed for loading goods.

However, a conventional attaching and disconnecting seat mechanism for a seat of a vehicle has a complicated structure, in which latch parts caught on front and rear wheels and strikers mounted on a lower frame, links for operating the components and various levers are connected to one another, and thus there is a difficulty in operation and a manufacturing cost is increased due to the complicated structure.

SUMMARY OF THE INVENTION

Therefore, it is an object of the present invention to provide an attaching and disconnecting seat mechanism for a seat of a vehicle, which can easily attached to and separated from strikers mounted on a car body floor by easily rotating a link connected to front and rear wheels through a lever acting the front strikers and lower a manufacturing cost by simplifying its structure.

To achieve the above object, the present invention provides an attaching and disconnecting seat mechanism of a seat for the vehicle having a structure that latch holes of a lower frame of the seat, which has front and rear wheels, are engaged to strikers fixed in front and rear seating holes of a car body floor, wherein a lever for relaxing the rear wheel is connected and mounted on a rotating bracket in the front latch hole through the use of a hinge shaft and a movable pin and the rotating bracket is connected through the use of a support lever and a connection link, on which the rear wheel is mounted.

Additional advantages objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
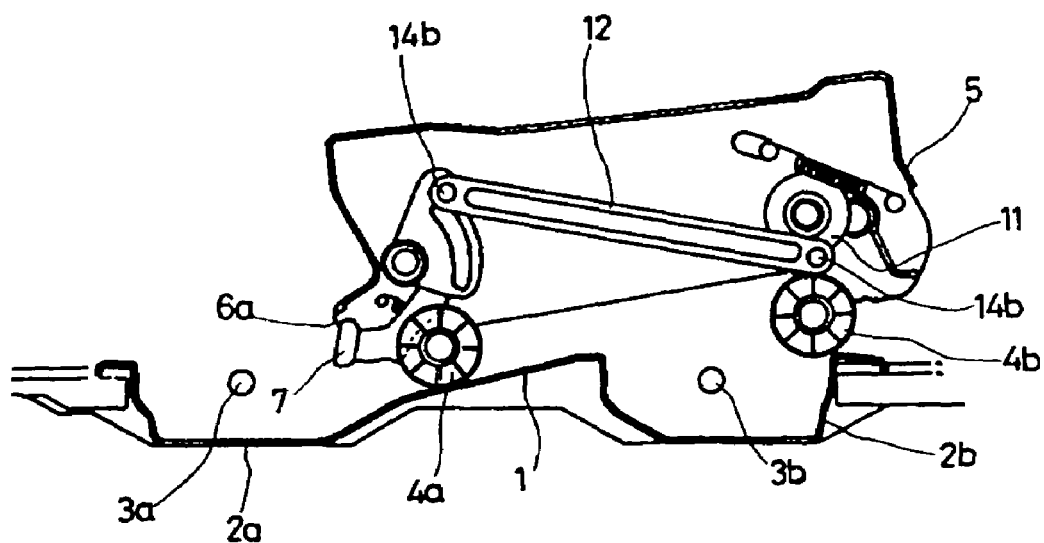
FIG. 1 illustrates a sectional view showing a state before a lower frame of a seat is mounted on strikers of a car body.
Figure 2:
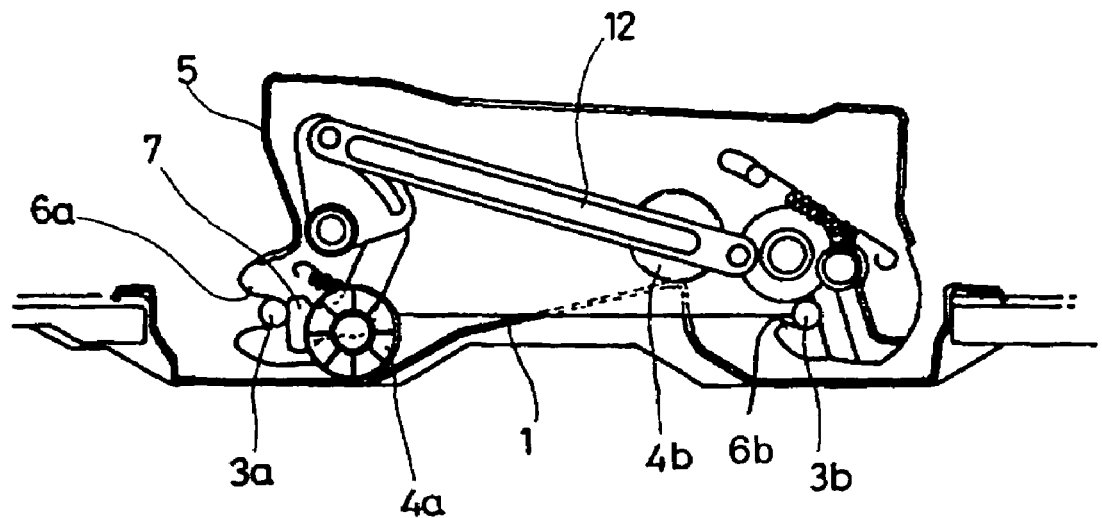
FIG. 2 illustrates a sectional view showing a state that the lower frame of the sat is mounted on the strikers.

FIGS. 1 and 2 illustrates sectional views respectively showing states before and after a lower frame of a seat for a vehicle is attached on strikers. As shown in the drawings, the seat for the vehicle has a structure that latch recesses 6a and 6b of a lower frame 5 of the seat, which has front and rear wheels 4a and 4b, are engaged with the strikers 3a and 3b fixed in front and rear seating recesses 2a and 2b of a car body floor 1. A lever 7 for relaxing the rear wheel is connected and mounted on a rotating bracket 8 in the front latch hole 6a through the use of a hinge shaft 9 and a movable pin 10. The rotating bracket 8 is connected through the use of a support lever 11 and a connection link 12, on which the rear wheel 4b is mounted.

The movable pin 10 of the lever 7 for relaxing the rear wheel can freely move in a guide slot 13 of the rotating bracket 8 by external force. The connection link 12 is connected between the support lever 11 and the rotating bracket 8 at both ends by use of fixing pins 14a and 14b.

Meanwhile, on an upper surface of the lower frame 5, is fixed the seat having a seating part and a back rest part (not shown).

Referring FIGS. 3a through 3d, operation of the present invention will be described hereinafter.

Figure 3A:
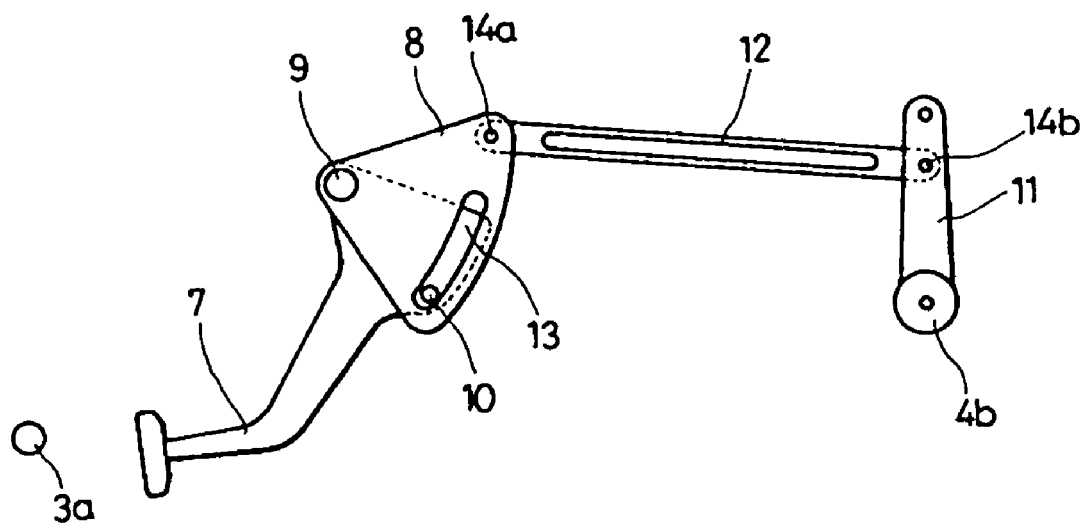
FIGS. 3a through 3d illustrates views showing operation states of links of the present invention.
Figure 3B:
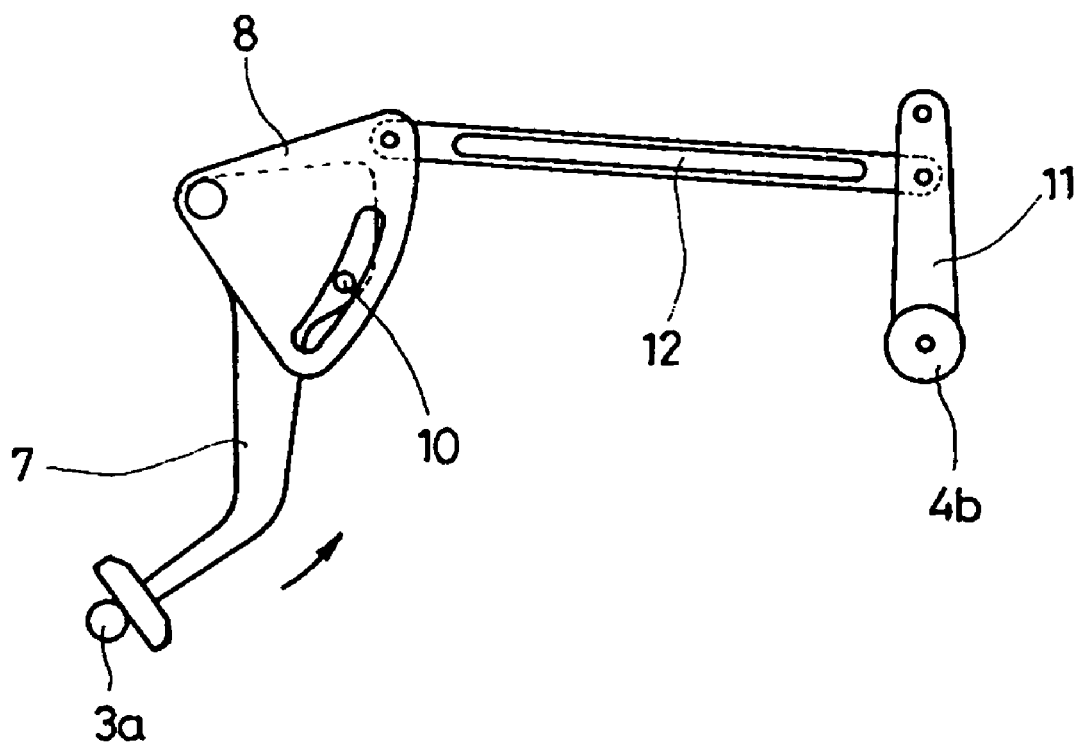

First, the lower frame 5 maintains a state of FIG. 1, which is a state before the rear wheel relaxing lever 7 mounted in the front latch recess 6a of the lower frame 5 touches the front striker 3a, as shown in FIG. 3a. If the lower frame 5 pushes the rear wheel relaxing lever 7 touching the front striker 3a as shown in FIG. 3b, the rear wheel relaxing lever 7 is rotated in a counterclockwise direction, which is in the direction of the arrow shown in FIG. 3b, and at the same time, the movable pin 10 is moved along the guide hole 13 of the rotating bracket 8.

Figure 3C:
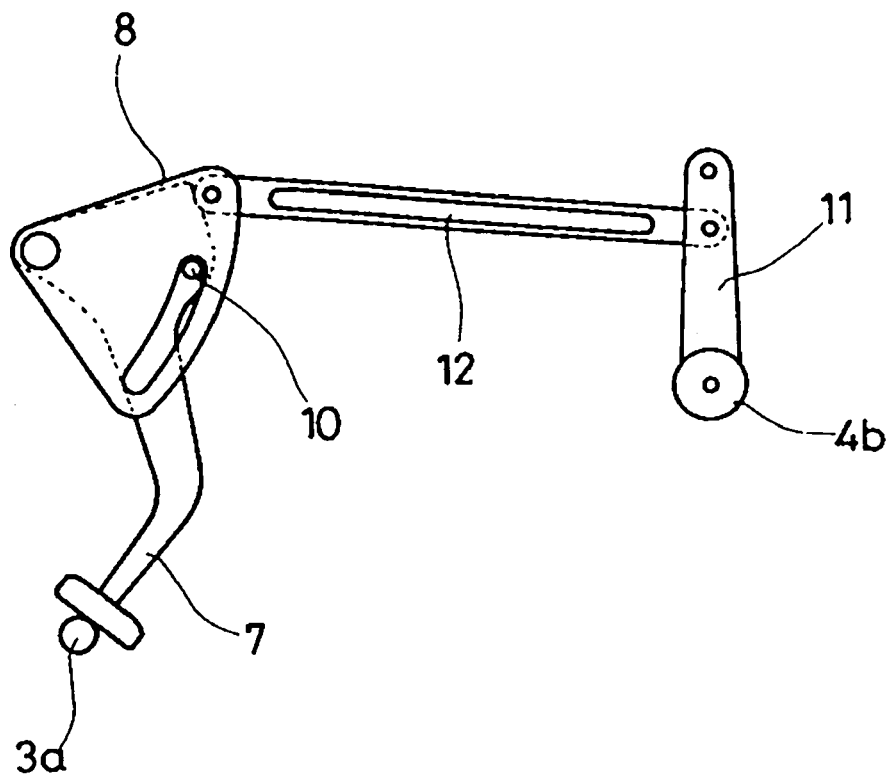
Figure 3D:
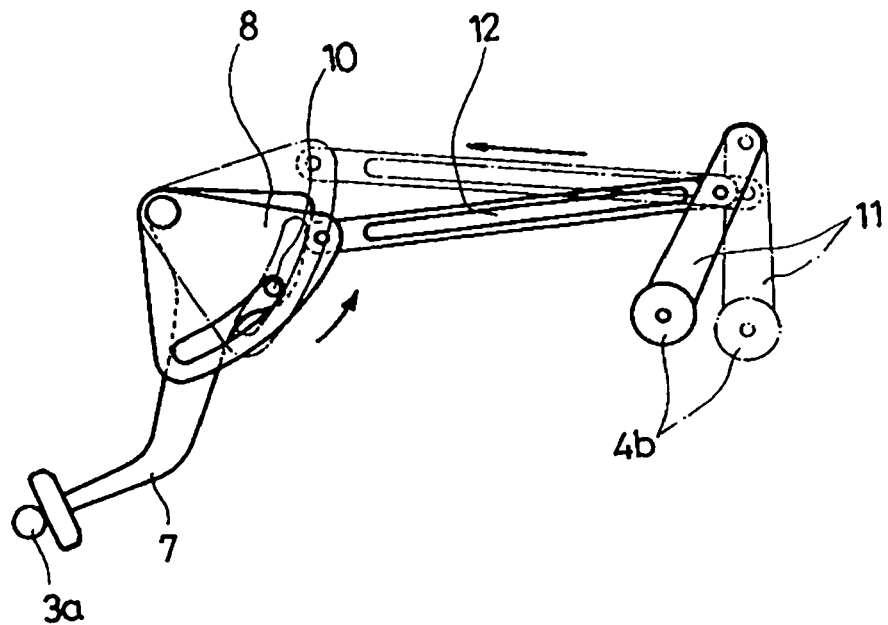

Next, as shown in FIG. 3c, the rear wheel relaxing lever 7 is continuously rotated until the movable pin 10 reaches an upper end of the guide hole 13 of the rotating bracket 8. After that, as shown in FIG. 3d, when load is applied to the movable pin 10, the rotating bracket 8 is rotated on the hinge shaft 9 in the counterclockwise direction, which is in the direction of the arrow of FIG. 3d.

Therefore, the rotating bracket 8 is lifted while pulling the connection link 12 connected to the rotating bracket 8, and at the same time, pulls the support lever 11 having the rear wheel 4b fixed on the connection link 12. As shown in FIG. 2, the rear wheel 4b is pulled and lifted is seated on a moving path of the car body floor 1, and thereby the seat is firmly mounted on the strikers 3*a* and 3*b*.

To separate or disconnect the seat from the strikers 3*a* and 3*b*, the present invention is operated in the contrary or opposite manner.

As described above, the attachment and disconnection of a seat for vehicles according to the present invention can easily separate and attach the lower frame of the seat to and from the strikers through the connection link connected in a simple structure, thereby lowering the manufacturing cost.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A mechanism for attaching a seat to and disconnecting the seat from a vehicle, the mechanism for attaching the seat to and disconnecting the seat having a structure with latch recesses on a lower frame of the seat, front and rear wheels for respectively engaging with front and rear seating recesses of a car body floor the latch recesses located for engaging strikers fixed in the front and the rear seating recesses of the car body floor, and the mechanism for attaching a seat to and disconnecting the seat from the vehicle comprising:

a control lever for controlling operation of the rear wheel, the control lever and a rotating bracket being connected and rotatably mounted on a hinge shaft, and the rotating bracket is coupled to the control lever via a pin; and the rotating bracket is connected to the rear wheel via a connection link and a support lever, and the rear wheel is mounted to the support lever.

2. The mechanism for attaching the seat to and disconnecting the seat from the vehicle according to claim 1, wherein the pin of the control lever is freely movable, in a guide hole of the rotating bracket between a pair of opposed end positions, by an external force.

3. The mechanism for attaching the seat to and disconnecting the seat from the vehicle according to claim 1, wherein a first fixing pin connects a first end of the connection link to the rotating bracket and a second fixing pin connects a second end of the connection link to the support lever.

4. The mechanism for attaching the seat to and disconnecting the seat from the vehicle according to claim 1, wherein an end of the support lever, remote from the second wheel, is mounted to a fixed pivot to facilitate rotation of the support lever and the second wheel by the lever.

* * * * *